Jan. 11, 1944.     E. R. OWENS     2,338,868
GAUGING APPARATUS
Filed March 4, 1942     9 Sheets-Sheet 1

INVENTOR
Elliott R. Owens,
BY
ATTORNEYS

Jan. 11, 1944.                 E. R. OWENS                 2,338,868
                             GAUGING APPARATUS
                          Filed March 4, 1942          9 Sheets-Sheet 5

INVENTOR
Elliott R. Owens,
BY
ATTORNEYS

INVENTOR
Elliott R. Owens,
BY
ATTORNEYS

Jan. 11, 1944.                E. R. OWENS                2,338,868
                          GAUGING APPARATUS
                         Filed March 4, 1942           9 Sheets-Sheet 7
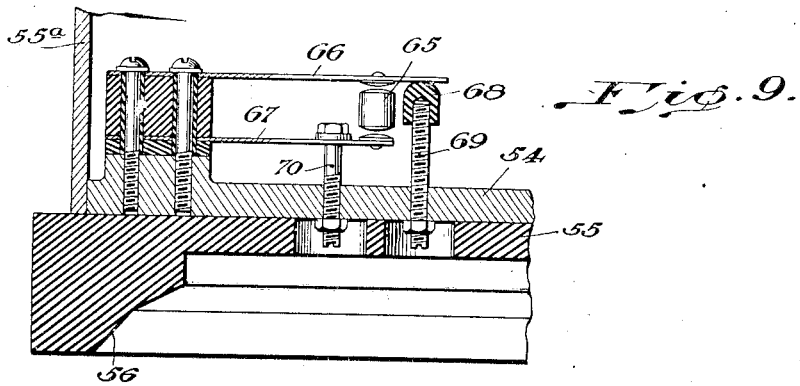
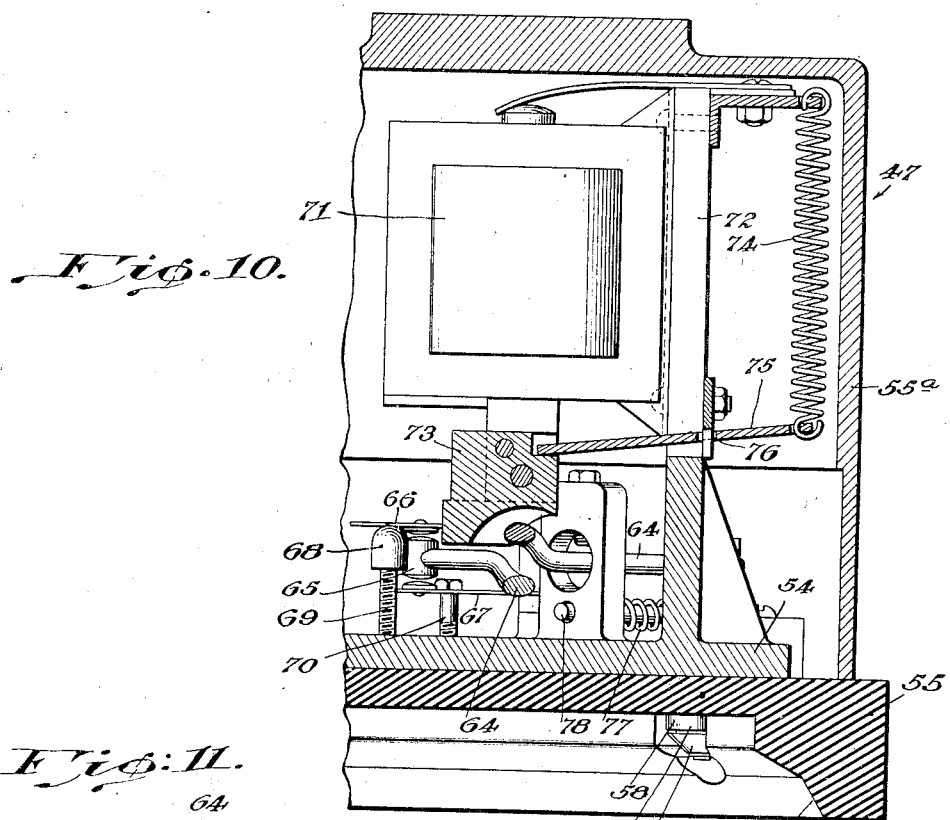
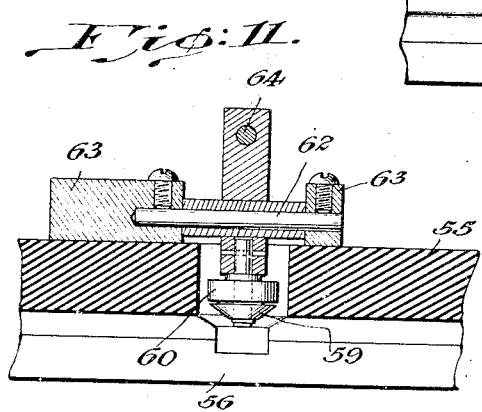
INVENTOR
Elliott R. Owens
BY
Rule & Hoge
ATTORNEYS Jan. 11, 1944.　　　E. R. OWENS　　　2,338,868
GAUGING APPARATUS
Filed March 4, 1942　　　9 Sheets-Sheet 8
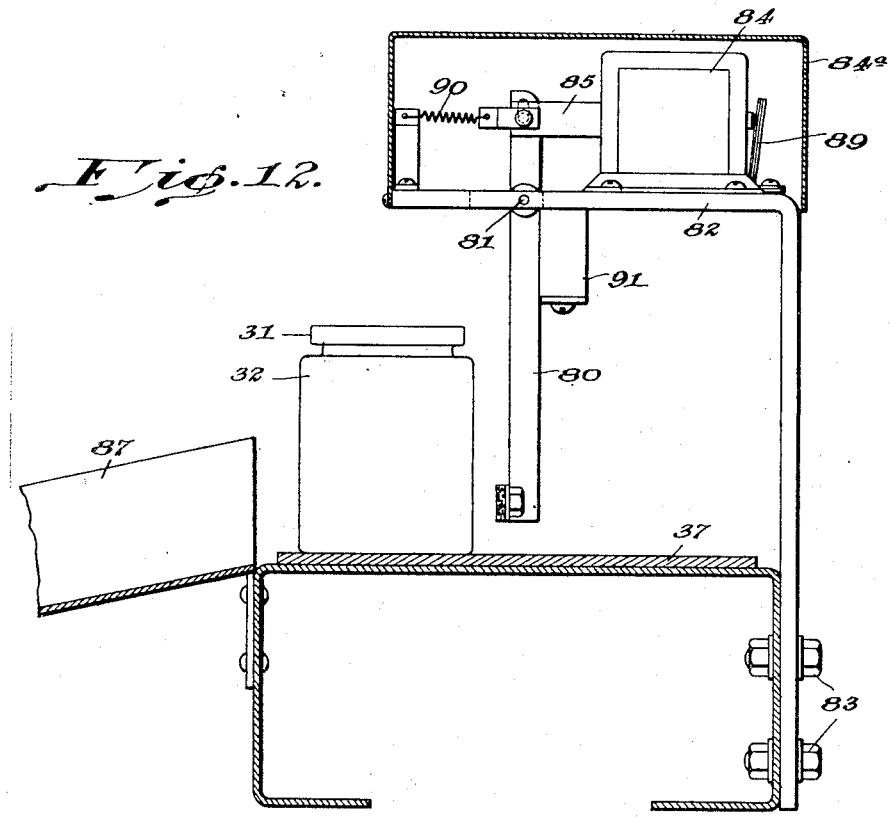
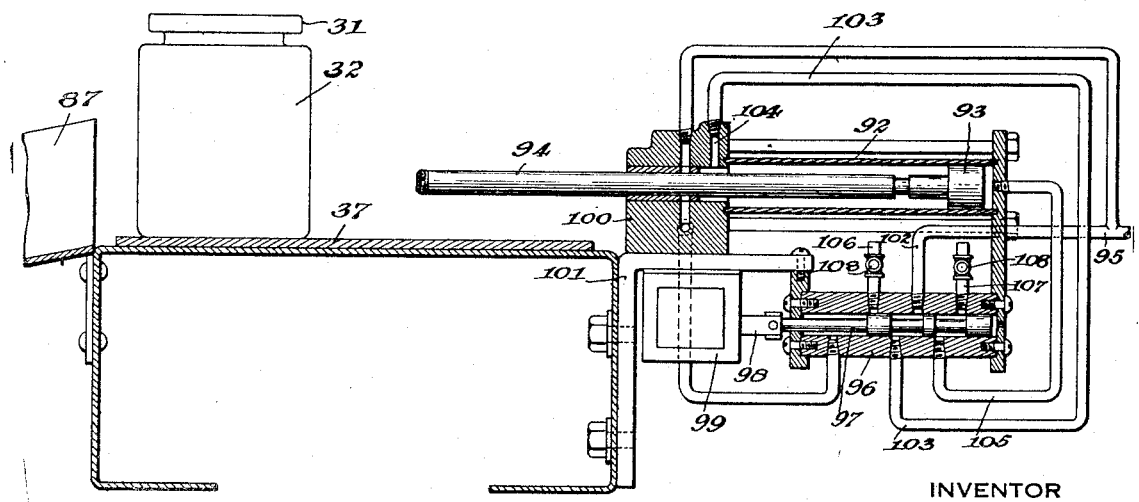
INVENTOR
Elliott R. Owens
BY
ATTORNEYS Jan. 11, 1944.  E. R. OWENS  2,338,868
GAUGING APPARATUS
Filed March 4, 1942  9 Sheets-Sheet 9

INVENTOR
Elliott R. Owens,
BY
Rule & Hoge,
ATTORNEYS

Patented Jan. 11, 1944

2,338,868

UNITED STATES PATENT OFFICE 2,338,868

GAUGING APPARATUS

Elliott R. Owens, Oakland, Calif., assignor to Owens-Illinois Pacific Coast Company, a corporation of Delaware Application March 4, 1942, Serial No. 433,353

10 Claims. (Cl. 209—82)

My invention relates to apparatus for gauging bottles, jars and other articles having round surfaces, and for automatically discarding imperfect articles or those which do not come within prescribed gauge limits. The invention in the form herein illustrated is particularly adapted for gauging the circular necks or finishes of jars or the like having circular sealing surfaces for the attachment of caps or closure devices.

Present day commercial methods of sealing caps to glass jars or the like by automatic machinery require accuracy in the size and shape of the sealing surfaces in order to insure perfect seals. If the diameter of the sealing surface is greater or less than the prescribed diameter or the sealing surface is not perfectly round, the article must be discarded. An object of the present invention is to provide gauging apparatus which operates automatically to gauge articles in rapid succession and which at the same time is accurate and reliable in its operation and automatically discards defective articles.

Other objects of the invention will appear hereinafter.

Referring to the accompanying drawings.

Figure 8:
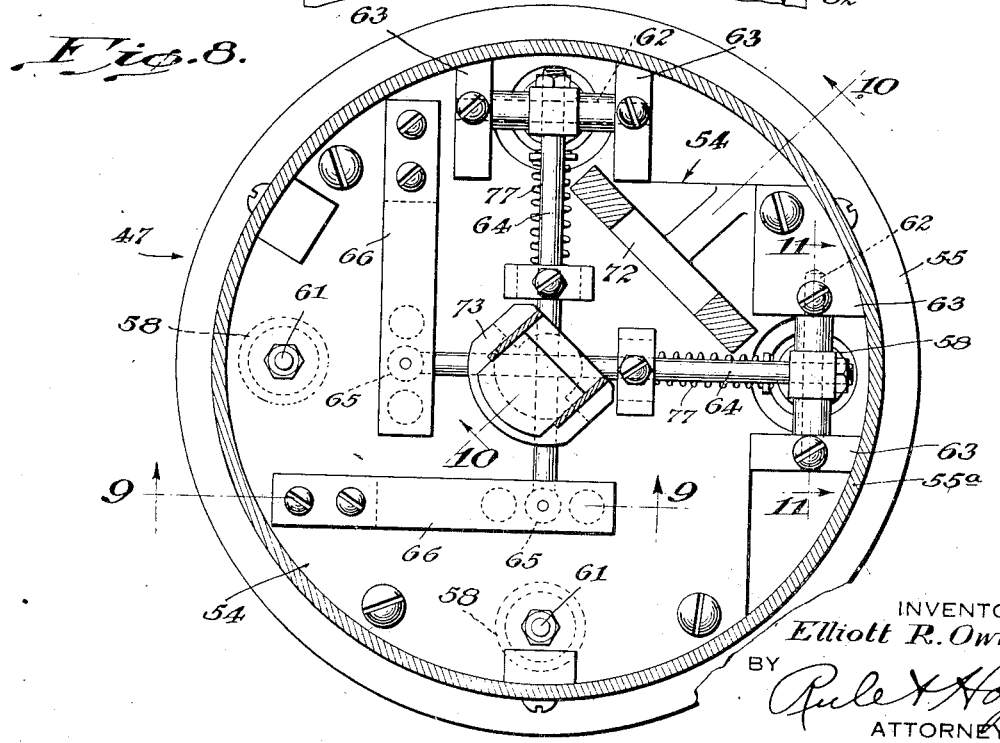
Fig. 8 is a section at the line 8—8 on Fig. 7.

Figs. 9, 10 and 11 are sections taken respectively at the lines 9—9, 10—10 and 11—11 on Fig. 8.

Figure 2:
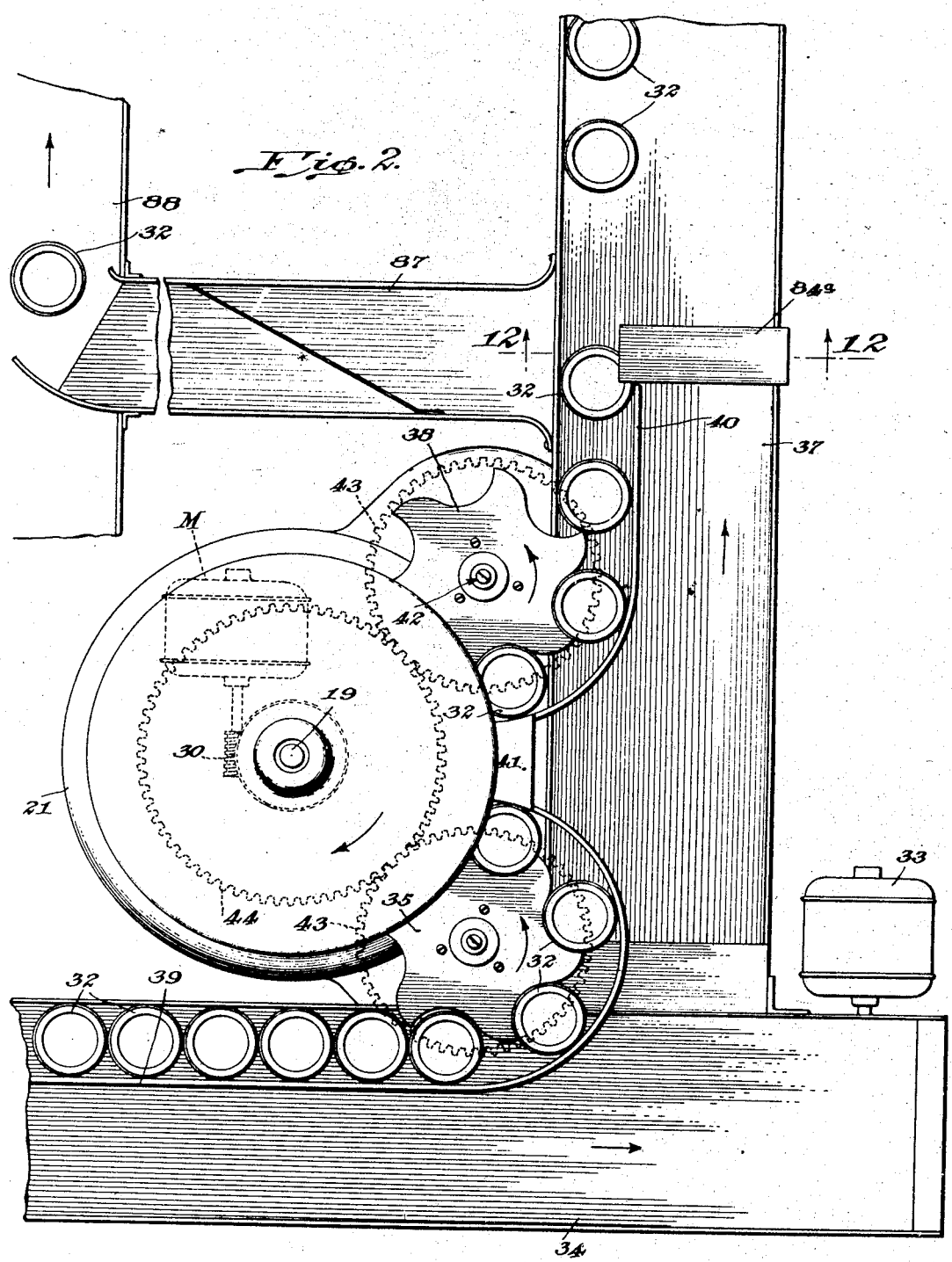
Fig. 2 is a plan view of the same.

Fig. 12 is a section at the line 12—12 on Fig. 2 showing an electromagnetic ejector mechanism.

Fig. 13 is a view similar to Fig. 12 showing a modification embodying an air operated ejector.

Figure 14:
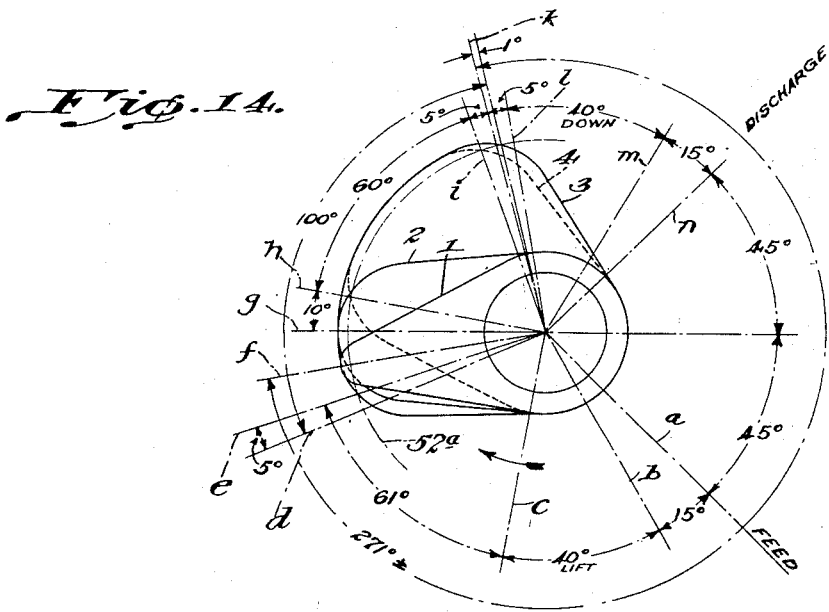

Fig. 14 is a cam chart illustrating the sequence of operations.

Figure 15:
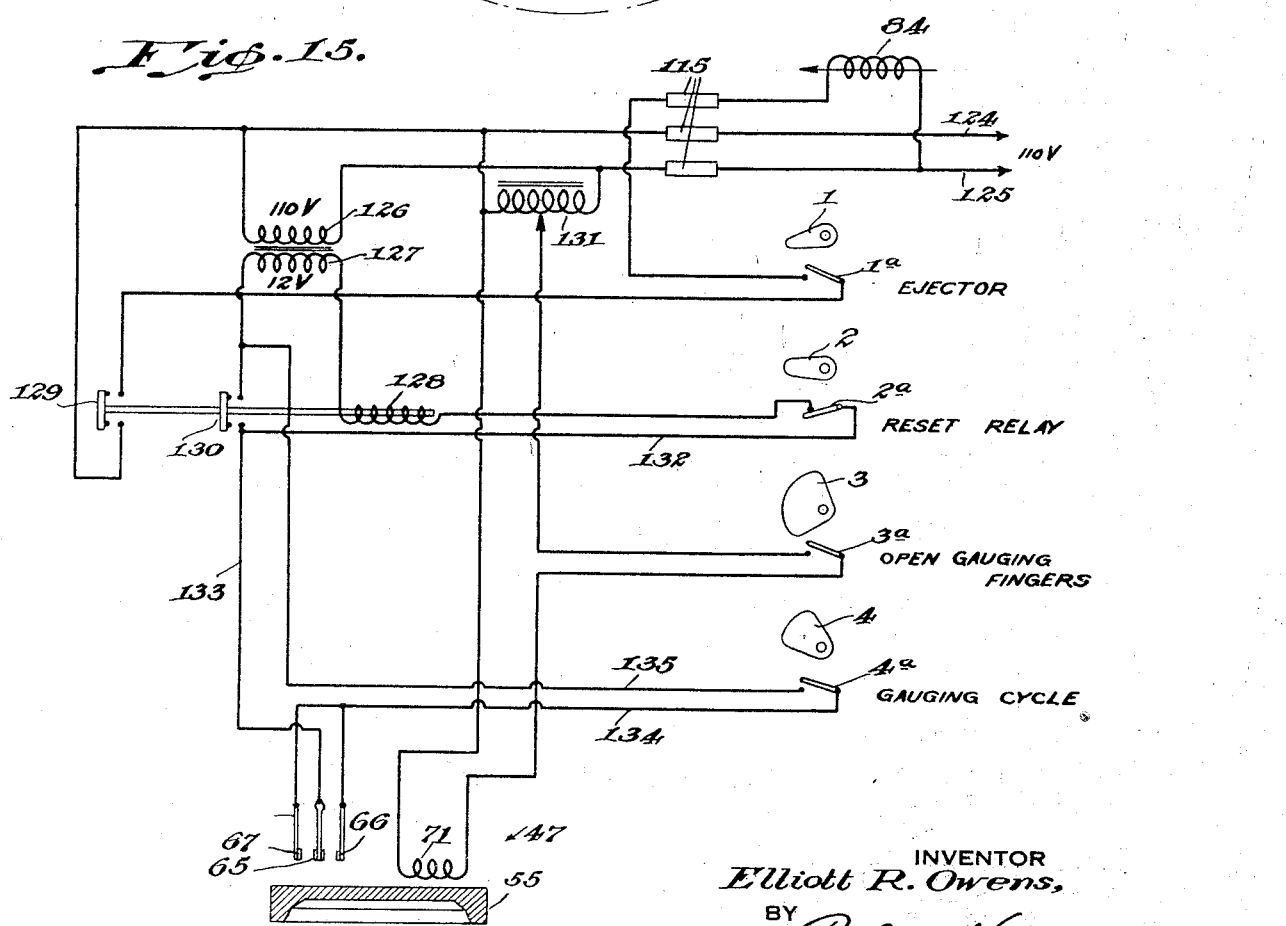

Fig. 15 is a wiring diagram for a gauging head and the electrical controls.

Figure 1:
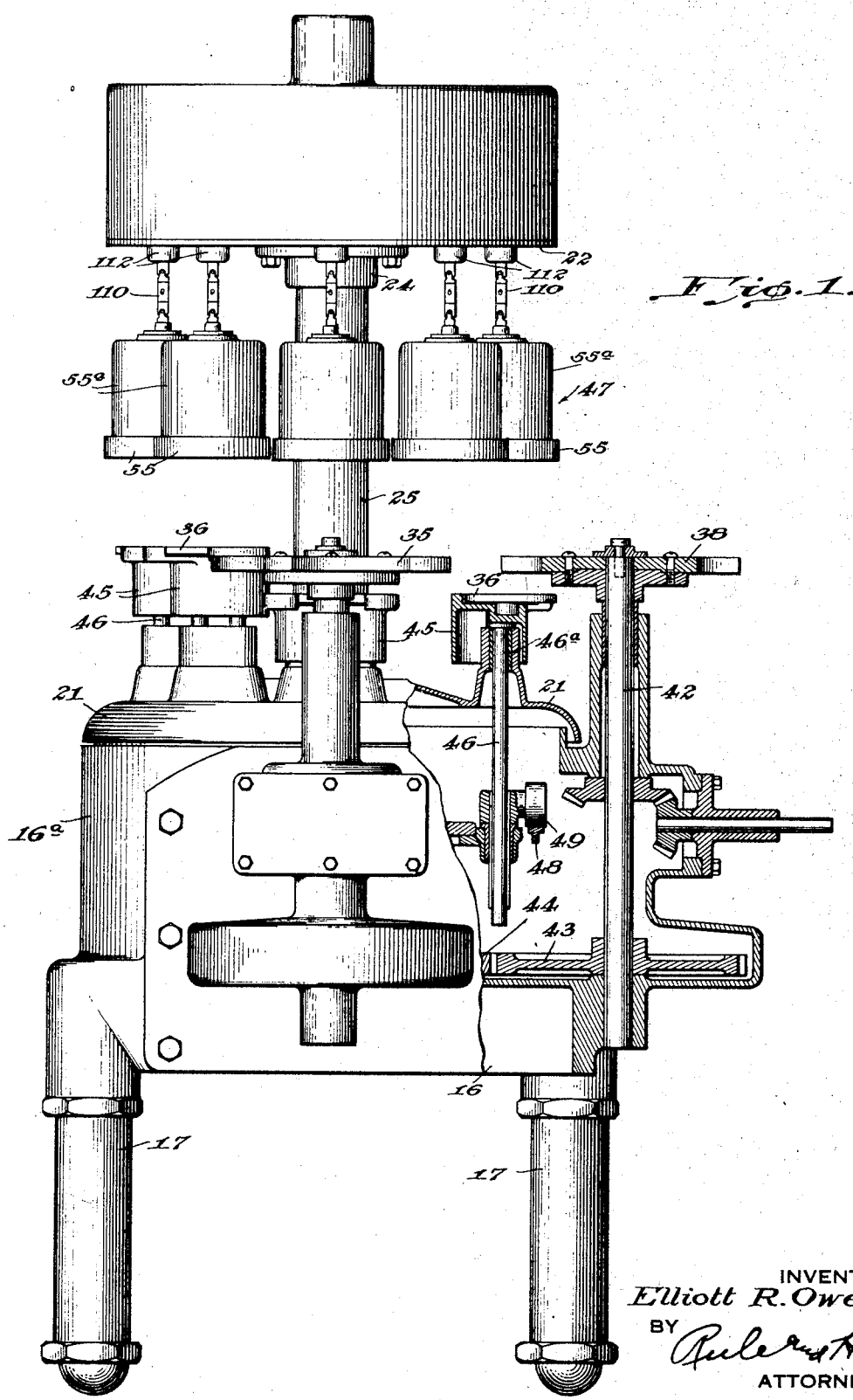
Fig. 1 is a part-sectional elevation of gauging mechanism constructed in accordance with my invention.
Figure 3:
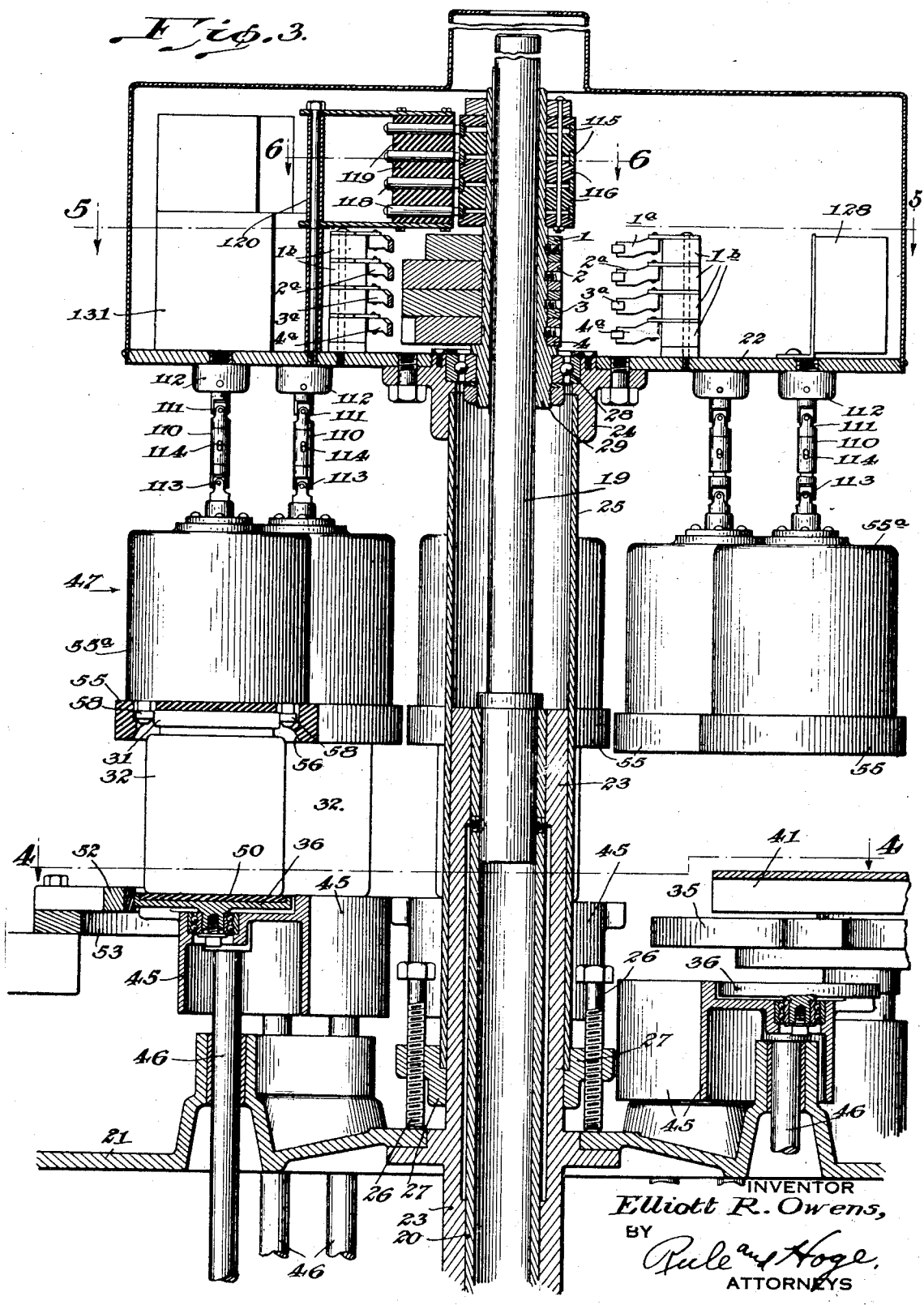
Fig. 3 is a sectional elevation of the upper portion of the machine on a larger scale.

Referring to Figs. 1 and 3, the machine comprises a base 16 on legs 17 and supporting a stationary center column or post 19, the latter made in sections including a lower tubular section 20 and a solid upper section secured thereto. Mounted for continuous rotation about the axis of the center post 19 is a carriage comprising an upper horizontal plate or platform 22 and a lower plate or casting 21 which provides a cover for the gear casing 16ª formed on the base 16. The plate 21 is attached to a tubular shaft 23 and the platform 22 is connected by a flanged collar 24 to a tubular shaft 25 which telescopes with the shaft 23 and is adjustable up and down thereon by means of adjusting bolts 26 threaded through a collar 27 which provides a support for the lower end of the shaft 25. Ball bearings 28 are interposed between the collar 24 and a sleeve 29 having a fixed mounting on the stationary center column 19. The carriage is rotated by an electric motor M (Fig. 2) having driving connections with the shaft 23 through worm gearing 30.

Figure 4:
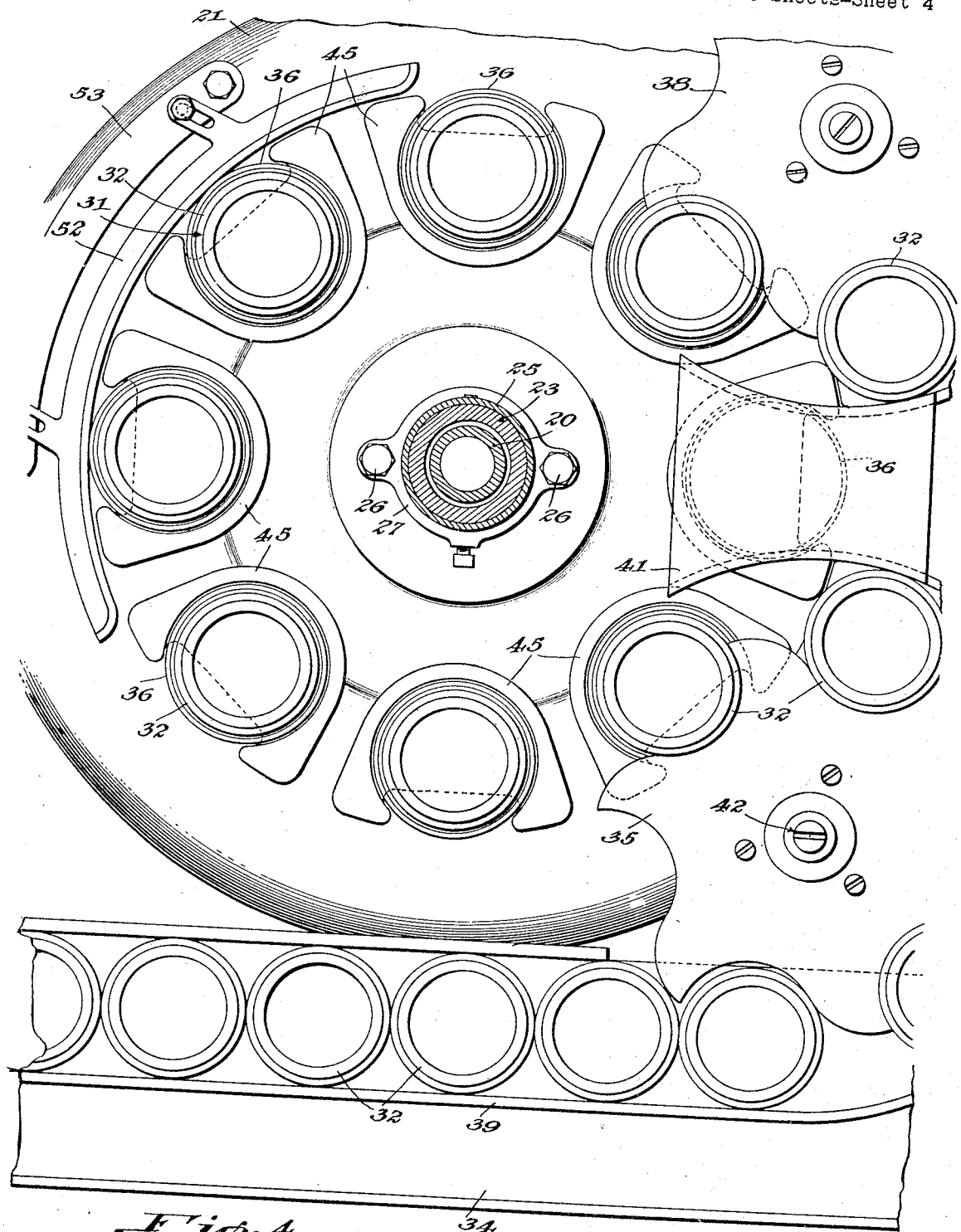
Fig. 4 is a section plan at the line 4—4 on Fig. 3.
Figure 7:
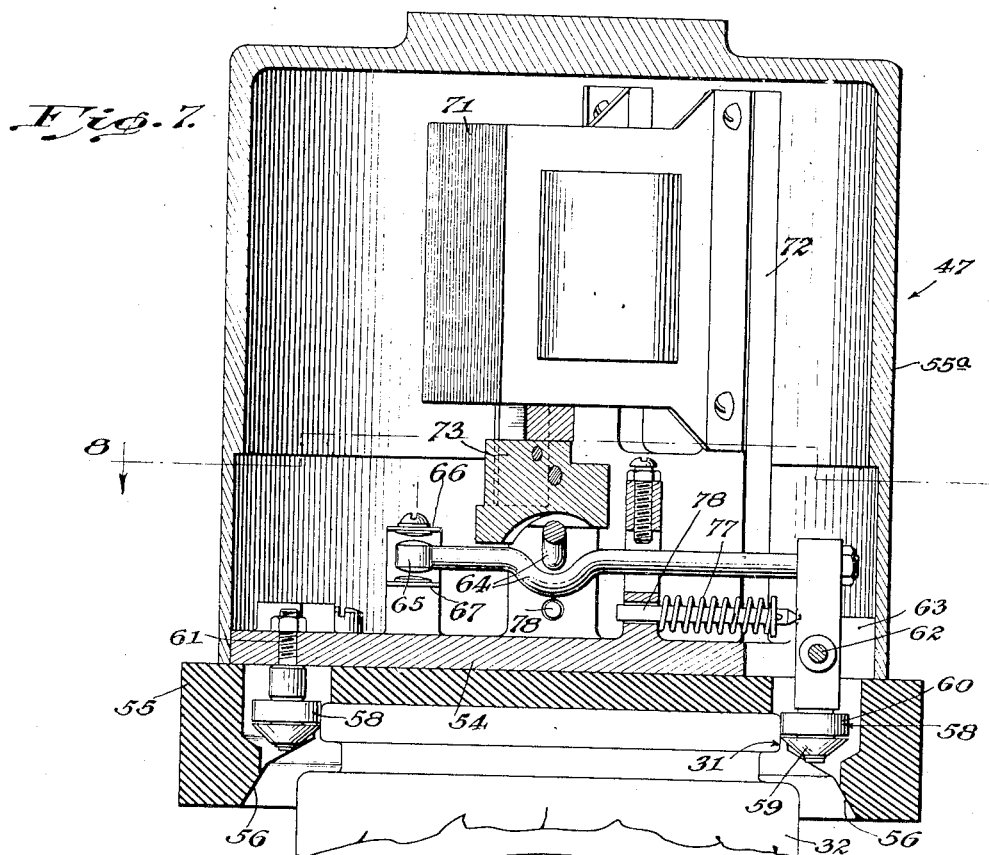
Fig. 7 is a sectional elevation of a gauging head or unit.

The apparatus is herein shown (see Fig. 7) as operating to gauge the peripheries 31 of the neck ends or finishes of the jars 32, although adaptable for gauging other articles. The jars are transferred to and from the gauging machine by apparatus shown in Fig. 2, including an electric motor 33 which drives an endless belt conveyor 34 on which the jars are placed and by which they are advanced to a star wheel 35 which transfers them to lifting pads 36 (Figs. 1 and 4) by which they are lifted to gauging position and on which they are supported during the gauging operations. The jars are transferred from the lifting pads to a second horizontal conveyor 37 by means of a star wheel 38. The jars are guided during their transfer to and from the carriage by stationary guide rails 39 and 40, and an intermediate guide plate 41. The star wheels are secured to the upper ends of vertical shafts 42 journalled for rotation in the machine base and driven by gears 43 keyed to said shafts and meshing with a gear 44 fixed to the carriage shaft.

Figure 5:
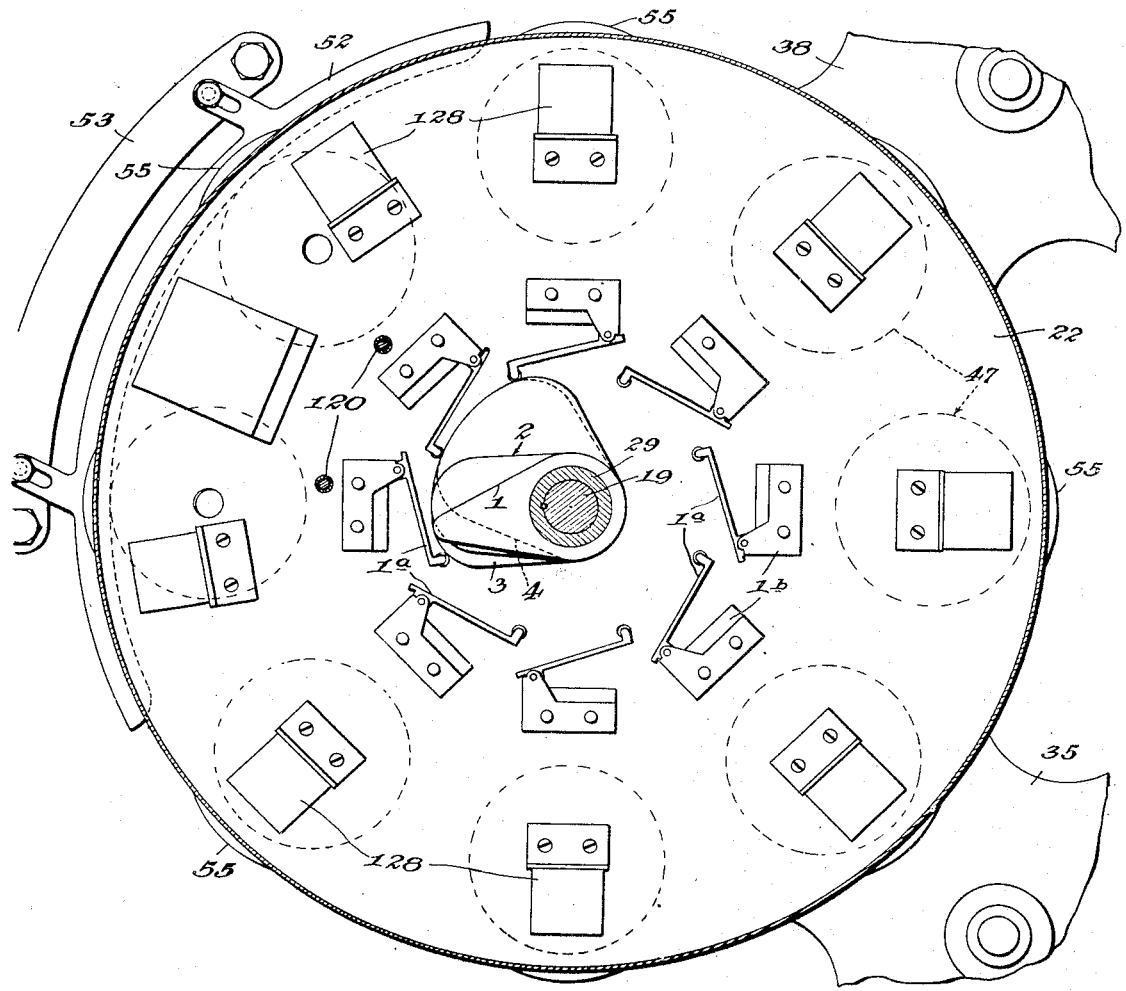
Fig. 5 is a section at the line 5—5 on Fig. 3.

The pads 36 on which the jars are supported for the gauging operations are in the form of disks journalled to rotate freely on lifting frames 45 attached to lifting rods 46 by means of which the jars are lifted into engagement with the sealing heads or units 47 suspended from the upper platform 22. The rods 46 are journalled in bearings 46ª (Fig. 1) on the carriage and the up and down movements of the rods and parts carried thereby are controlled by a stationary cam track 48 on which run cam follower rolls 49 connected to the rods. The holding pads 36 are provided with disks 50 of rubber or the like for frictionally holding the jars and insuring their rotation with the pads. The rotation of the jars during the gauging operation is effected by means of an arc-shaped shoe 52 (Figs. 3, 4 and 5) having a facing of rubber or other friction driving material presenting a contact surface concentric with the carriage and arranged to engage the flanged peripheries of the pads 36. The shoe 52 is adjustably mounted on a stationary supporting bar 53 which in turn is mounted on the machine base.

The gauging units 47 (see Figs. 7 to 11) are all of the same construction. Each unit comprises a main casting 54 in the form of a plate mounted on a base 55. A cylindrical casing 55a removably attached to the base provides a housing for the gauging mechanism. The under side of the base is recessed to receive the upper end of the article to be gauged, the walls 56 being tapered or frusto-conical for guiding the workpiece into central position when lifted by the pad 36. A plurality of gauging fingers 58, herein shown as four in number, are mounted in position to contact the surface 31 which is to be gauged. Each gauging finger includes a conical guiding piece 59 and a roll or bearing disk 60 for rolling contact with the surface to be gauged.

Two of the gauging fingers have a fixed mounting in the casting 54 by means of stems 61. The other two gauging fingers are mounted for swinging movement toward and from the work-piece. For this purpose they are mounted to swing about pivot pins 62 which are anchored in blocks 63 which may be formed on the casting 54. Each of the swinging fingers has attached to its upper end an electrical contact arm 64 extending horizontally and provided at its free end with a contact head 65 positioned between upper and lower electrical contact arms in the form of leaf springs 66 and 67 mounted on the casting 54 and electrically insulated therefrom. The upper spring 66 normally rests on a stop 68 of insulating material on the upper end of an adjustable rod 69. The lower spring 67 normally bears upwardly against and its upward movement is limited by an adjustable stop post 70.

Mounted within the casing 55a is an electromagnet 71 which may be anchored to a bracket 72 formed on the main casting 54. The electromagnet includes a vertically movable core, to the lower end of which is attached a block 73 positioned over the arms 64 and adapted when lowered to swing said arms about the pivots 62 and thereby spread the contact fingers out of the path of the work-piece while the latter is moved into gauging position. A coil tension spring 74 (Fig. 10) is attached to one end of a lever arm 75 fulcrumed at 76 on the bracket 72, the other end of the arm being in engagement with the head 73 and holding the latter in its lowered position while the electromagnet is deenergized.

When a jar has been moved up to gauging position a circuit is established for the electromagnet as hereinafter described so that the magnet is energized and lifts the head 73, thereby releasing the arms 64. Coil compression springs 77 (Fig. 7) now operate through rods 78 to swing the gauging fingers into contact with the workpiece. If the surface to be gauged is of the prescribed diameter, the arms 64 are held in an intermediate position with the heads 65 out of contact with the arms 66 and 67. If the diameter of the work-piece is below the required gauge, the springs 77 will lift the contacts 65 into engagement with the contact arms 66. If the diameter of the work-piece is greater than the required gauge, the contact heads 65 are lowered and make contact with the arms 67. In either event the article will later be discarded by an ejector mechanism now to be described.

Referring to Fig. 12, the ejector comprises a vertically disposed arm 80 connected by a pivot 81 to a supporting frame 82 or bracket which is secured by bolts 83 to the conveyor frame. An electromagnet 84 is mounted within a housing 84a on the frame 82 and its armature 85 has a slot and pin connection with the upper end of the arm 80. The magnet coil when energized draws the armature inwardly, thereby operating the arm 80 and causing it to push the jar 32 off the conveyor 37 onto an inclined chute 87. The jar moves by gravity down the chute to a conveyor 88 (Fig. 2). A leaf spring 89 (Fig. 12) serves as a buffer to absorb the shock of the magnet core when the magnet is energized. When the magnet is deenergized, a coil spring 90 returns the core. A stop 91 limits the return movement of the arm 80.

Fig. 13 illustrates a modified form of ejector mechanism comprising a piston motor operated by air or other fluid. The motor includes a cylinder 92, a piston 93 and a piston rod 94, extended to form an ejector rod. Air under pressure for operating the motor is supplied through a pressure pipe 95 under the control of a valve 96. The latter comprises a valve plunger 97 connected to the core 98 of a solenoid electromagnet 99 which may be connected up in the control circuits in the same manner as the electromagnet 84 (Figs. 12 and 15). The ejector rod 94 is slidable in a bearing block 100 which is mounted on a bracket 101 and provides a support for the piston motor. While the electromagnet remains deenergized the valve plunger 97 remains in the position shown which admits air pressure to the left of the motor piston and holds the ejector plunger in its retracted position. The air pressure is supplied through a pipe 102 to the valve and from the valve through a pipe 103 which opens through a port 104 into the motor cylinder. When the electromagnet is energized, the valve plunger 97 is moved to the left, thereby opening the pipe 102 to a pipe 105 leading to the right-hand end of the motor cylinder. This movement of the valve plunger also cuts off the pipe 103 from the pressure line and opens it to atmosphere through an exhaust pipe 106. The motor therefore operates the ejector plunger. When the electromagnet is deenergized the valve plunger is returned, thereby causing a reversal of the piston motor. During the return movement of the motor piston the air is exhausted through an exhaust pipe 107. Throttle valves 108 are provided in the exhaust pipes and are adjustable for adjustably controlling the speed of the ejector plunger.

Referring to Fig. 3, the gauging heads or units 47 are suspended beneath the upper platform 22 in a manner to permit each head to move laterally in any direction for centering it on the workpiece and at the same time permitting it to retain its upright position. The means for suspending it further permits a limited up and down movement so that the full weight of the head may rest on the work-piece during the gauging operation. The method of suspension, moreover, is such that rotative movement of the head about its vertical axis is prevented. The means for suspending the head is in the form of a rod 110 having a universal joint connection 111 with a connector block 112 attached to the under surface of the platform 22. The rod 110 has a second universal joint connection 113 adjacent its lower end with the gauging head. It will be seen that with this construction the head may move freely horizontally or laterally in any direction which may be required to adjust it centrally on the work-piece as the latter is lifted, the rod 110 taking an inclined direction while the head remains upright. The rod 110 is made in telescoping sections providing a slip joint permitting the head to be lifted a short distance determined by the slot and pin connection 114. The platform 22 from which the gauging heads are suspended is adjusted vertically to such a position that each jar or work-piece when lifted to gauging position by its cam will lift the gauging head a short distance and thereby transfer the full weight of the head to the work-piece and thus hold the latter with sufficient pressure against the rubber disk 50 to prevent slippage during the gauging operation. As shown in Fig. 3, the heads 47 at the left-hand side of the center post are held in their lifted position while those at the right-hand side are shown in the lowered position.

Figure 6:
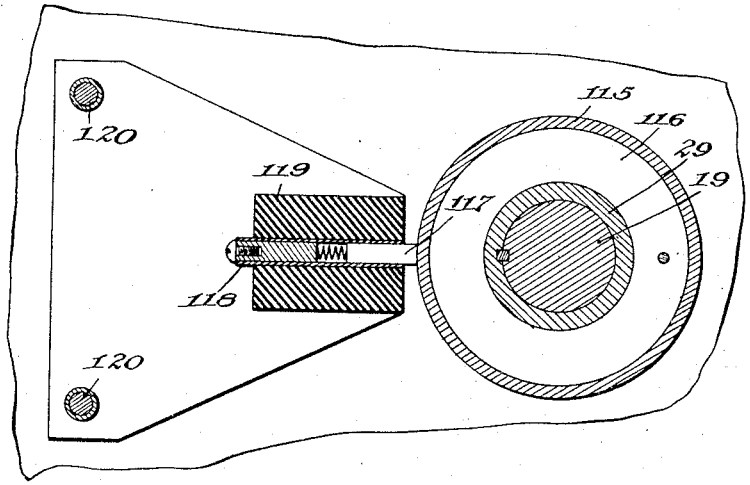
Fig. 6 is a section at the line 6—6 on Fig. 3.

The electrical controlling mechanism by which the gauging heads are caused to operate in succession includes a series of collector rings 115 (Figs. 3 and 6) carried on collars 116 of insulating material, said collars having a fixed mounting on the stationary sleeve 29. Electrical contact pieces 117 are mounted in tubular connecting rods 118 and are spring-held against the rings 115. The rods 118 are mounted in an insulating block 119 supported on posts 120 fixed to the platform 22 for rotation with the carriage. A series of stationary cams 1, 2, 3 and 4, mounted on the sleeve 29 and each rotatively adjustable thereon, operate electrical switches which control the gauging operations. The cams 1, 2, 3 and 4 serve to operate in succession sets of switches individual to the gauging units. Each said unit has associated therewith such a set of switches 1ª, 2ª, 3ª and 4ª operated respectively by the cams 1, 2, 3 and 4. Micro-switches may be employed, each comprising a cam operated switch lever and switch contact mechanism within a switch box 1ᵇ.

Fig. 15 is a wiring diagram of the control system for one gauging unit. Each unit is provided with a separate control system such as shown in Fig. 15 except that a single solenoid 84 which operates the ejector mechanism serves for all of the gauging units. Alternating current may be supplied from any suitable source through mains 124 and 125. A step-down transformer has its primary winding 126 connected across the mains and its secondary 127 connected in circuit with a relay solenoid 128 which operates a contact 129 in circuit with the ejector magnet 84, and a contact 130 in a holding circuit for the relay.

The sequence of operations of the electrical control devices is as follows: While there is no jar 32 in gauging position in the head 47, the solenoid 71 which operates the gauging fingers remains deenergized with the fingers spread to open position. As soon as a jar has been lifted to the gauging head and commences to rotate, the cam 3 closes the normally open switch 3ª, thus establishing a circuit for the magnet coil 71 and causing it to lift its armature and thus permit the gauging fingers to move to operative position. The coil 71 is connected in circuit with an auto transformer 131 which is connected across the mains 124, 125.

As soon as the gauging fingers close on the jar, with the revolving jar properly centered on the lifting pad, the cam 4 closes the switch 4ª in circuit with the gauging contacts 65, 67 and the relay solenoid 128. This circuit may be traced from the right-hand side of the transformer coil 127 through relay coil 128, normally closed switch 2ª, wires 132, 133, to contact 65 and thence through contact 66 or 67, wire 134, switch 4ª and wire 135 to the other terminal of the transformer coil. This circuit remains open at the gauging contact 65 if the jar is of correct gauge. If the jar is not of correct gauge or out-of-round, the contact 65 is moved to close the circuit, thereby energizing the relay and causing it to move the contacts 129 and 130 to closed positions. The contact 130 establishes a holding circuit for the relay independent of the gauging contact 65.

The cam 4 holds the switch 4ª closed while the jar makes approximately one complete rotation about the axis of its supporting pad, although this may be varied by changing the length of the cam face. When the cam 4 runs off its switch the latter opens the gauging circuit and terminates the gauging operation. Following this and before the lifting frame 45 commences its downward movement, the cam 3 releases the switch 3ª and opens the circuit of electromagnet coil 71 so that the armature 73 (Fig. 10) is lowered. This releases the gauging fingers from the jar so that they will not offer any resistance to the lowering of the jar.

When the jar has thus been released, it is lowered from the gauging head and then transferred from the gauging machine to the conveyor 37. When it reaches a position in line with the ejector, the cam 1 closes the switch 1ª in the circuit of the ejector solenoid 84. If the relay has been energized through the operation of a jar out of gauge, then the closing of the switch 1ª completes the circuit for the ejector magnet, causing the jar to be ejected. If, on the other hand, the jar is within the gauge requirements so that the relay magnet 128 has not been energized, the circuit for the ejector magnet remains open at contact 129 and the ejector remains inactive, permitting the jar to remain on the conveyor 37.

After the ejector cam 1 has operated, the cam 2 momentarily opens the switch 2ª in the relay circuit and thereby effects the opening of the relay contacts 129, 130, thus resetting the relay for another cycle. This takes place before the next jar is gauged.

Fig. 14 illustrates diagrammatically the sequence of the movements of a jar and its gauging head and the gauging operations during a complete rotation of the carriage. The positions of the gauging head and jar are indicated by radial lines a, b, c, etc. With the carriage rotating in a clockwise direction as indicated by the arrow, a jar is fed from the conveyor 34 to the carriage while its gauging head is moving from position a to position b. During the continued movement from position b to c, the jar is lifted to the gauging head. The jar and head then travel idly from position c to position e. At position d the shoe 52 engages the holding pad and commences rotation of the jar about its axis, such rotation being continued until position k is reached. The arc of contact of the shoe 52 is indicated by broken line 52ª. When the point e is reached the cam 3 closes the switch 3ª so that the solenoid 71 operates to lift its armature and release the gauging fingers as before described. The cam 3 holds its switch closed until position k is reached. At position f the cam 1 closes its switch and thereby causes the ejector to discharge the jar at the ejector station providing said jar is out of gauge and has accordingly set the relay 128 during the preceding revolution of the carriage. The cam 2 operates at position $g$ to open the relay circuit and thereby reset the relay. At the position $h$ the cam 4 closes its switch and holds it closed during the gauging cycle which extends to position $i$. Shortly following this, at position $k$, the cam 3 releases its switch so that the solenoid 71 operates to release the gauging fingers. Between positions $l$ and $m$ the pad with the jar thereon is lowered, and between positions $m$ and $n$ the jar is transferred by the star wheel 38 to conveyor 37.

Modifications may be resorted to within the spirit and scope of my invention.

I claim:

1. The combination of a support for an article to be gauged, a gauging unit, means for moving said support relative to said unit and thereby operatively positioning the article relative to said unit, said unit comprising gauging fingers, conical guides and rolls on said fingers positioned to engage opposite sides of a surface to be gauged and center it with respect to said unit, means for causing a relative rotation of said unit and article support, one of said fingers being pivotally mounted on the gauging unit, an electrical contact arm carried by said finger, means for holding said finger in contact with the surface to be gauged, and electro-responsive indicating means, said contact arm being arranged to close the circuit for said indicating means when said surface extends outside of predetermined gauge limits.

2. Apparatus for gauging round surfaces of articles which comprises a support for the articles, a gauging unit, means for relatively moving said support on said unit to bring an article into gauging relation to said unit, means for rotating the article relative to said unit, means for centering the article relative to its axis of rotation, a gauging finger having pivotal mounting in said unit and positioned to contact the surface to be gauged, a spring for holding said finger in contact with said surface, electro-responsive means for indicating an article out of gauge, means providing an electrical circuit for said indicating means, a switch arm carried by said gauging finger and included in said circuit, an electrical contact in said circuit cooperating with said switch arm, and an electromagnet arranged to swing said gauging finger away from said article.

3. A gauging unit comprising a plurality of gauging fingers symmetrically arranged about an axis in position to engage the peripheral surface of a round article to be gauged, said fingers being vertically disposed and one of said fingers pivoted to swing about a horizontal axis to and from a gauging position in which it engages the said surface, and a spring for holding said swinging finger in contact with the surface to be gauged, said gauging unit comprising an electromagnet, said electromagnet being operative when deenergized to swing said finger away from said surface.

4. A gauging unit comprising a plurality of gauging fingers symmetrically arranged about an axis in position to engage the peripheral surface of a round article to be gauged, said fingers being vertically disposed and one of said fingers pivoted to swing about a horizontal axis to and from a gauging position in which it engages the said surface, a spring for holding said swinging finger in contact with the surface to be gauged, means for rotating the article relative to said unit, and electro-responsive means operative in response to the swinging movement of said swinging finger to indicate surfaces extending outside of predetermined gauge limits.

5. Gauging apparatus comprising in combination a carriage, means for rotating the carriage about a vertical axis, a plurality of gauging units mounted on the carriage for rotation therewith, means for bringing articles to be gauged in succession to said gauging units, means for conveying the articles away from said units in a predetermined path, electro-responsive means for separating defective articles from the others, electrical control systems individual to said gauging units and each comprising a series of switches mounted on the carriage, stationary cams arranged to operate said switches, and means controlled thereby for effecting the operation of said segregating means.

6. Article gauging apparatus comprising in combination a holder for an article to be gauged, means for rotating said holder and an article thereon, a gauging unit positioned above said holder, a support, and means by which the gauging unit is suspended from said support, said suspending means constructed to permit bodily movement of the gauging unit laterally in any direction without tilting movement and holding it against rotative movement.

7. Gauging apparatus comprising in combination a holder for articles to be gauged, means for rotating the holder and an article thereon, a gauging unit positioned above said holder, a support spaced above the gauging unit, suspending means by which the gauging unit is suspended from said support, means for effecting relative vertical movement of the said holder and gauging unit for bringing an article on said holder into gauging position, said suspending means including a vertically disposed rod, means providing a universal joint connection between the upper end of the rod and said support, and a universal joint connection between the lower end of the rod and the gauging unit, said connections permitting swinging movement of the rod in any direction while preventing rotative movement of the gauging unit, thereby permitting the gauging unit to be centered on the article to be gauged.

8. Gauging apparatus comprising in combination a holder for articles to be gauged, a gauging unit positioned above said holder, a support spaced above the gauging unit, suspending means by which the gauging unit is suspended from said support, means for effecting relative vertical movement of the said holder and gauging unit for bringing an article on said holder into gauging position, said suspending means including a vertically disposed rod, means providing a universal joint connection between the upper end of the rod and said support, and a universal joint connection between the lower end of the rod and the gauging unit, said connections permitting swinging movement of the rod in any direction while preventing rotative movement of the gauging unit, thereby permitting the gauging unit to be centered on the article to be gauged, said rod including separate sections relatively movable lengthwise, thereby permitting the gauging unit to be lifted for a limited distance relative to the support from which it is suspended for transferring the weight of the lifting unit to the article to be gauged.

9. Gauging apparatus comprising in combination a gauging unit, a support spaced above said unit, means by which the gauging unit is suspended from the support, said means including a vertically disposed rod, and universal joints connecting the upper and lower ends of said rod respectively to said support and the gauging unit, each of said universal joints comprising horizontal pivots, said rod including telescopic parts having a slip joint connection.

10. Apparatus for gauging round surfaces of articles, comprising a support for the articles, a gauging head positioned directly above the support, means for relatively moving said support and head vertically toward each other for bringing a said article into gauging position, horizontally rotating rolls carried by said head and arranged to engage the said surface of the article when the latter is centered relative to a vertical axis of rotation, means for effecting a relative rotation of said head and the article to be gauged about said axis, a gauging finger carrying one of said rolls, said finger pivotally mounted on said head, an electrical contact arm carried by said finger, means for holding said finger with the roll carried thereby in contact with the surface to be gauged, means cooperating with said contact arm to close an electrical circuit when said surface extends beyond predetermined limits, and electroresponsive indicating means in said circuit.

ELLIOTT R. OWENS.